United States Patent Office 3,441,583
Patented Apr. 29, 1969

3,441,583
AMINOXYORGANOSILICON MATERIALS
Robert A. Murphy, Burnt Hills, N.Y., assignor to General
Electric Company, a corporation of New York
No Drawing. Filed Jan. 4, 1965, Ser. No. 423,354
Int. Cl. C07f 7/02, 7/18
U.S. Cl. 260—448.2     13 Claims

ABSTRACT OF THE DISCLOSURE

Aminoxyorganosilicon materials are provided, including aminoxyorganosilicon compounds, and polymers, such as aminoxyorganosilanes, aminoxyorganocyclopolysiloxanes, and aminoxyorganopolysiloxanes. These aminoxyorganosilicon materials can be made by effecting contact between a hydroxylamine and an organosilicon hydried in accordance with the following equation, $$YOH + HSi \equiv \rightarrow YOSi + H_2 \rightarrow$$

where Y is an amino radical. The aminoxyorganosilicon materials can be employed as curing agents and coupling agents for silanol-containing organosilicon materials.

---

The present invention relates to aminoxyorganosilicon materials and to methods for making them. More particularly, the present invention relates to certain aminoxyorganosilanes, aminoxyorganocyclopolysiloxanes and linear aminoxyorganopolysiloxanes and other aminoxyorganosilicon materials.

The aminoxyorganosilicon materials of the present invention are characterized by having at least one radical of the formula, (1)     —OY attached to silicon through a silicon-oxygen linkage where Y is a monovalent amine radical selected from $-N(R)_2$ and a heterocyclic amine, and R is a monovalent hydrocarbon radical. One method of making the aminoxyorganosilicon materials of the invention is by reacting a hydroxylamine and a silicon hydride, as shown by the following equation.

(2)     $YOH + HSi \equiv \rightarrow YOSi \equiv + H_2$ where Y is defined above. Another method that can be employed is by reacting a chlorosilane and a hydroxylamine in the presence of an acid acceptor. A third reaction is by effecting reaction between an alkoxysilane, and a hydroxylamine and continuously removing the resulting alcohol.

Included by the hydroxylamines shown by Equation 2, which can be employed are heterocyclic hydroxylamines such as N-hydroxylpyrrolidine, N-hydroxyethyleneamine, N-hydroxypiperidine, N - hydroxymorpholine, etc. Diorgano substituted hydroxylamines such as N,N,-dimethyl-, diethyl-, diisopropyl-, dipropyl-, dibutyl-, dipentyl-, dihexyl-, dicyclohexyl-, methylethyl-, methylpropyl-, methylbutyl-, diphenyl-, di-tolyl-, methylphenyl-, methylnaphthyl-, etc.

The term "silicon hydride" as utilized in the practice of the method of the invention shown by Equation 2 includes any silicon containing material having a hydrogen atom attached thereto which is capable of reacting with a hydroxylamine in accordance with Equation 2. For example, a material having the radical $\equiv SiH$ can be employed in which the remaining valences of the silicon atom can be filled with a member selected from hydrogen, R', OR, siloxy, divalent hydrocarbon, and mixtures thereof, where R' includes R radicals above and halogenated R radicals.

Included by the aminoxyorganosilicon materials of the present invention are, (a) aminoxyorganosilanes having the formulae, (3)     $(R')_a Si[OY]_{4-a}$ (4)     $(R')_b (A)_c Si[OY]_{4-(b+c)}$ where Y and R' as defined above, A is a member selected from hydrogen, halogen, alkoxy, and $R_3SiO_{0.5}$, $a$ is a whole number equal to 0, 2, or 3, $b$ is a whole number equal to 0 to 2, inclusive, $c$ is an integer equal to 1 to 3, inclusive, and the sum of $b$ and $c$ is equal to 1 to 3, inclusive. In addition to the aminoxyorganosilanes of the above formulae, the aminoxyorganosilicon materials of the present invention also include, (b) aminoxyorganopolysiloxanes composed of from 3 to 8 chemically combined siloxy units, and consisting of at least one aminoxysiloxy unit of the formula, (5)
$$\begin{array}{c} R' \\ | \\ YO\underset{|}{Si}O \end{array}$$

chemically combined with up to seven diorganosiloxy units of the formula, (6)     $(R'')_2 SiO$ (c) aminoxyorganocyclopolysiloxanes having at least one unit of Formula 5 chemically combined with from 1 to 18 units of Formula 6, and chain-stopped with $(R'')_3 SiO_{0.5}$ units, where R' and Y are as defined above, and R'' is selected from monovalent hydrocarbon radicals, halogenated monovalent hydrocarbon radicals and cyanoalkyl radicals. There are also included, aminoxyorganosilicon materials of the formula, (7)

and, (8)

where R', R'' and Y are as defined above, $d$ is a whole number equal to 0 to 3, inclusive, $e$ is an integer equal to 1 to 18, inclusive, Z is selected from oxygen, $$R''' \text{ and } \begin{array}{c} R' \\ | \\ -R'''Si- \\ | \\ R' \end{array} R'''—$$

where R''' is a divalent hydrocarbon radical.

Radicals included by R of the above formulae are for example, aryl radicals such as phenyl, naphthyl, etc.; aralkyl radicals such as benzyl, phenylethyl, aliphatic radicals such as vinyl, cyclohexyl, methyl, ethyl, propyl, butyl, heptyl, octyl, etc. Radicals included by R' are all of the aforementioned R radicals, as well as halogenated derivatives thereof, for example, chlorophenyl, trifluoropropyl, etc. R'' radicals include R' and cyanoalkyl, such as cyanoethyl, cyanopropyl, cyanobutyl, etc. Radicals included by A are for example, hydrogen, chloro, bromo, methoxy, t-butoxy, trimethylsiloxy, etc. Radicals included by R''' above are for example, alkylene radicals, and arylene radicals, such as phenylene, methylene, ethylene, trimethylene, butylene, etc. In the above formulae where R, R', R'', R''', and A respectively can represent more than one radical, these radicals can be all the same or any two or more of the aforementioned radicals.

Included by the aminoxyorganosilanes shown by Formula 3 are for example,

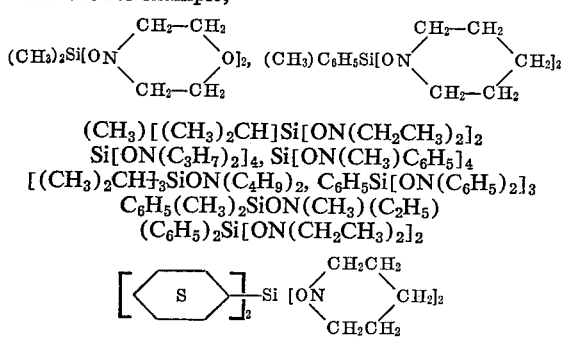

$(CH_3)[(CH_3)_2CH]Si[ON(CH_2CH_3)_2]_2$
$Si[ON(C_3H_7)_2]_4$, $Si[ON(CH_3)C_6H_5]_4$
$[(CH_3)_2CH]_3SiON(C_4H_9)_2$, $C_6H_5Si[ON(C_6H_5)_2]_3$
$C_6H_5(CH_3)_2SiON(CH_3)(C_2H_5)$
$(C_6H_5)_2Si[ON(CH_2CH_3)_2]_2$

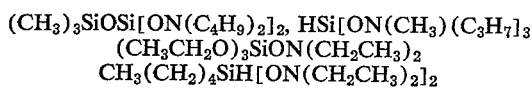

Aminoxyorganosilanes included by Formula 4 are for example, $(CH_3)_3SiOSi[ON(C_4H_9)_2]_2$, $HSi[ON(CH_3)(C_3H_7)]_3$
$(CH_3CH_2O)_3SiON(CH_2CH_3)_2$
$CH_3(CH_2)_4SiH[ON(CH_2CH_3)_2]_2$ Aminoxy silanes included by Formula 7 are for example,

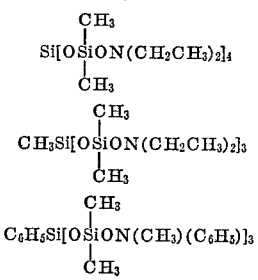

Some of the aminoxyorganopolysiloxanes having units shown by Formulae 5 and 6 include for example,

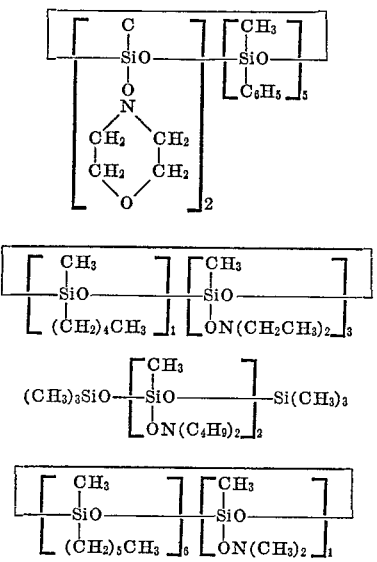

Included by the aminoxyorganosilicon materials of Formula 8 are for example,

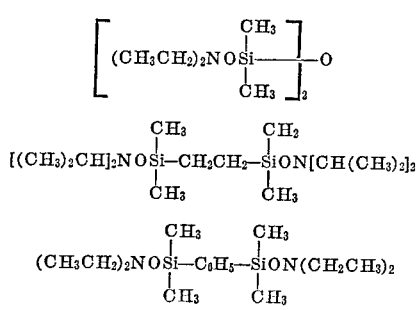

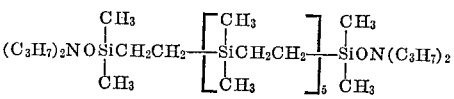

As shown in my copending applications Ser. No. 423,289 now U.S. Patent 3,379,659, Ser. No. 423,311 now U.S. Patent 3,296,199, and Patent 3,341,486 all assigned to the same assignee as the present invention, the aminoxyorganosilicon materials can be utilized in making organopolysiloxane foams, and low modulus organopolysiloxane room temperature vulcanizing organopolysiloxane mixtures useful for making low modulus organopolysiloxane elastomers. In addition the aminoxyorgano materials can be employed as deep section curing agents, and coupling agents, etc. In preparing the aminoxyorganosilicon materials by the method shown by Equation 2, there can be employed a temperature in the range of between about $-20°$ C. to $200°$ C., depending upon the boiling point of either the hydroxylamine or the silicon hydride employed. Preferably, however, a temperature between $0°$ C. to $100°$ C. is utilized. It has been found expedient to react the hydroxylamine and the silicon hydride in an inert atmosphere and substantially anhydrous conditions due to the fact that hydrogen is liberated during the reaction and that the resulting aminoxyorganosilicon materials are sensitive to water.

Depending upon the particular aminoxyorganosilicon material that is being prepared the order of addition of the reactants forming the reaction mixture can vary. In most instances, however, the order of addition is not critical. However, in instances where silanes such as Formula 4 are made, utilizing a silicon hydride having more than one hydrogen atom attached to silicon, it has been found expedient to add the hydroxylamine to the silicon hydride. On the other hand if it is desired to totally react all of the hydrogen of the silicon hydride, with the hydroxylamine, optimum results will be achieved if the silicon hydride is reacted with an excess of hydroxylamine. Accordingly, the addition of the silicon hydride to the hydroxylamine is preferred.

An additional method of preparing the aminoxyorganosilicon materials of the invention involves the reaction between an alkoxy silane of the formula;

$$(G)_fSiA'_{4-f}$$

where G is an alkoxy radical having from 1 to 8 carbons and A' is a member selected from hydrogen, halogen, and $(R')_3SiO$ and $f$ is an integer equal to 1 to 4 inclusive. In such instances it is preferred to conduct the reaction under reflux conditions to facilitate the continuous removal of the alcohol produced from the alkoxy silane so that the formation of the aminoxyorganosilicon material will be favored.

The recovery of the aminoxyorganosilicon material can be achieved in accordance with conventional distillation procedures to effect the separation of unreacted material from the desired product.

In order that those skilled in the art will be better able to practice the invention, the following examples are given by way of illustration and not by way of limitation. All parts are by weight.

EXAMPLE 1

Diphenylsilane was added to a 2 to 1 molar excess of N,N-diethylhydroxylamine over a 2 hour period at a temperature between $0°$ C. to $10°$ C. During the addition the mixture was constantly stirred and nitrogen gas was used to facilitate the removal of the hydrogen gas being formed. After the evolution of hydrogen had ceased, the excess diethylhydroxylamine was evaporated under reduced pressure. The mixture was then fractionally distilled. There was obtained a quantative yield of $$(C_6H_5)_2Si[ONEt]_2$$

having a boiling point between $140°$ C. to $150°$ C. at 0.05 mm.; $n_D^{25}$ 1.5250. Elemental analysis $C_{20}H_{30}N_2O_2Si$. Theory (in percent): C, 66.99; H, 8.43; N, 7.81, Si, 7.83. Found (in percent): C, 67.13; H, 8.15; N, 8.10; Si, 8.14.

EXAMPLE 2

There were added 129 parts of dimethyldichlorosilane to a mixture of 200 parts of diethylhydroxylamine and 175 parts of pyridine over a period of 45 minutes at a temperaturer of 25° C. After the addition was completed, the mixture was stirred for an additional 30 minutes at a temperature of 90° C. and then for 90 minutes at a temperature of 60° C. The mixture was then filtered of solid hydrochloride and the filtrate was fractionated. There was obtained a quantative yield of $$(CH_3)_2Si[ON(CH_2CH_3)_2]$$

having a boiling point between 84° C. and 85° C. at 9 mm.; $n_D^{25}$ 1.4261. Elemental analysis $C_{10}H_{26}N_2O_2Si$. Theory (in percent): C, 51.24, H, 11.18, N, 11.95, Si 11.99. Found (in percent): C, 51.09, H, 11.07, N, 12.03, Si, 11.98.

EXAMPLE 3

The procedure of Example 2 was repeated except that silicon tetrachloride was reacted with N,N-diethylhydroxylamine in the presence of sufficient pyridine to completely react all of the resulting hydrogen chloride produced. There was utilized about 4.5 moles of N,N-diethylhydroxylamine, per mole of silicon tetrachloride. There was obtained a quantative yield of $Si[ON(CH_2CH_3)_2]_4$; $n_D^{25}$ 1.4400. Elemental analysis $C_{16}H_{40}N_4O_4Si$. Theory (in percent): C, 50.49, H, 10.59, N, 14.72, Si, 7.38. Found (in percent): C, 49.28, H, 9.82, N, 14.31, Si, 7.57.

EXAMPLE 4

There were added to 69 parts of amylsilane, 121 parts of N,N-diethylhydroxylamine over a period of 4 hours and 40 minutes at a temperature of approximately 5° C. When the hydrogen evolution had ceased the mixture was fractionally distilled. The product obtained was $$C_5H_{11}SiH[ON(CH_2CH_3)_2]_2$$

having a boiling point between 74° C. to 78° C. at 0.2 mm.; $n_D^{25}$ 1.4356. Elemental analysis $C_{13}H_{32}N_2O_2Si$. Theory (in percent): C, 56.67, H, 11.67, N, 10.13, Si, 11.57. Found (in percent): C, 56.23, H, 11.37, N, 10.04, Si, 10.35.

EXAMPLE 5

Following the procedure of Example 2, a number of aminoxyorganosilicon materials were prepared by reacting a diethylhydroxylamine and an organosilicon compound having chlorine radicals attached to silicon, "Chlorosilicon Compound." The table below shows the resulting "Aminoxysilicon Material" which is the term employed in the tables of the following examples in place of aminoxyorganosilicon. There also is show certain physical constants and the elemental analysis.

| | Chlorosilicon Compound | Aminoxysilicon Material | $n_D^{25}$ |
|---|---|---|---|
| (a) | $[(CH_3)_3SiO]_2SiCl_2$ | $[(CH_3)_3SiO]_2Si[ON(CH_2CH_3)_2]_2$ | 1.4145 |
| (b) | $HSiCl_3$ | $HSi[ON(CH_2CH_3)_2]_3$ | 1.4397 |
| (c) | $(CH_3)_3SiOSiCl_3$ | $(CH_3)_3SiOSi[ON(CH_2CH_3)_2]_3$ | 1.4292 |

| Aminoxy Silicon Material | Elemental Analyses, Percent | | | | | | | |
|---|---|---|---|---|---|---|---|---|
| | Theory | | | | Found | | | |
| | C | H | N | Si | C | H | N | Si |
| (a) $C_{14}H_{38}N_2O_4Si_3$ | 43.93 | 10.01 | 7.32 | 22.02 | 43.36 | 9.87 | 7.65 | 20.72 |
| (b) $C_{12}H_{31}N_3O_3Si$ | 49.11 | 10.65 | 14.31 | 9.57 | 50.19 | 10.60 | 15.92 | 8.88 |
| (c) $C_{15}H_{39}N_3O_4Si_2$ | 47.20 | 10.30 | 11.01 | 14.72 | 46.84 | 10.07 | 10.79 | 14.72 |

EXAMPLE 6

In accordance with the procedure shown in Example 1, silicon hydrides as shown below, were reacted with N,N-diethylhydroxylamine to produce the corresponding aminoxy-substituted silicon material.

| | Silicon Hydride | Aminoxysilicon Material | $n_D^{25}$ |
|---|---|---|---|
| (a) | $CH_3Si(OSiH(CH_3)_2)_3$ | $CH_3Si[OSiON(CH_2CH_3)_2]_3$ with $CH_3$ groups | 1.4253 |
| (b) | $Si(OSiH(CH_3)_2)_4$ | $Si[OSiON(CH_2CH_3)_2]_4$ with $CH_3$ groups | 1.4301 |
| (c) | $(CH_3CH_2O)_3SiH$ | $(CH_3CH_2O)_3SiON(CH_2CH_3)_2$ | 1.4022 |

| Aminoxysilicon Material | Elemental Analyses, Percent | | | | | | | |
|---|---|---|---|---|---|---|---|---|
| | Theory | | | | Found | | | |
| | C | H | N | Si | C | H | N | Si |
| (a) $C_{14}H_{51}N_3O_6Si_4$ | 43.06 | 9.70 | 7.93 | 21.20 | 43.19 | 9.71 | 7.70 | 20.94 |
| (b) $C_{2}H_{64}N_4O_8Si_5$ | 42.56 | 9.52 | 8.27 | 20.74 | 42.37 | 9.41 | 8.40 | 20.93 |
| (c) $C_{14}H_{35}N_2O_5Si$ | 47.78 | 10.02 | 5.57 | 11.18 | 47.72 | 9.98 | 5.61 | 11.30 |

EXAMPLE 7

In accordance with the procedure described in Example 1, certain cyclic silicon hydrides as shown below were reacted with either N,N-diethylhydroxylamine or N-hydroxymorpholine resulting in the production of the aminoxysilicon materials shown below.

Theory (in percent): C, 46.70, H, 10.45, N, 9.08, Si, 18.20.
Found (in percent): C, 46.90, H, 10.61, N, 9.14, Si, 17.83.

EXAMPLE 10

Following the procedure of Example 1, equimolar amount of p-(dimethylsilyl)phenylene and N,N-diethyl-

| | Cyclic Silicon Hydride | Aminoxysilicon Material | $n_D^{25}$ |
|---|---|---|---|
| (a) | $\left[\begin{array}{c}CH_3\\-SiO-\\|\\(CH_2)_5CH_3\end{array}\right] \left[\begin{array}{c}CH_3\\-SiO-\\|\\H\end{array}\right]_3$ | $\left[\begin{array}{c}CH_3\\-SiO-\\|\\(CH_2)_5CH_3\end{array}\right] \left[\begin{array}{c}CH_3\\-SiO-\\|\\ON(CH_2CH_3)_2\end{array}\right]_3$ | 1.4314 |
| (b) | $\left[\begin{array}{c}CH_3\\-SiO-\\|\\H\end{array}\right]_4$ | $\left[\begin{array}{c}CH_3\\-SiO-\\|\\ON(CH_2CH_3)_2\end{array}\right]_4$ | 1.4342 |
| (c) | $\left[\begin{array}{c}CH_3\\-SiO-\\|\\(CH_2)_4CH_3\end{array}\right] \left[\begin{array}{c}CH_3\\-SiO-\\|\\H\end{array}\right]_3$ | $\left[\begin{array}{c}CH_3\\-SiO-\\|\\(CH_2)_4CH_3\end{array}\right] \left[\begin{array}{c}CH_3\\-SiO-\\|\\ON(CH_2CH_3)_2\end{array}\right]_3$ | 1.4333 |
| (d) | $\left[\begin{array}{c}CH_3\\-SiO-\\|\\H\end{array}\right]$ | $\left[\begin{array}{c}CH_3\\-SiO-\\|\\O\\|\\N(CH_2CH_2)_2O\end{array}\right]_4$ (morpholino) | 1.4745 |
| (e) | $\left[\begin{array}{c}CH_3\\-SiO-\\|\\(CH_2)_4CH_3\end{array}\right]_2 \left[\begin{array}{c}CH_3\\-SiO-\\|\\H\end{array}\right]_2$ | $\left[\begin{array}{c}CH_3\\-SiO-\\|\\(CH_2)_4CH_3\end{array}\right]_2 \left[\begin{array}{c}CH_3\\-SiO-\\|\\ON(CH_2CH_3)_2\end{array}\right]_2$ | 1.4346 |
| (f) | $\left[\begin{array}{c}CH_3\\-SiO-\\|\\(CH_2)_5CH_3\end{array}\right]_2 \left[\begin{array}{c}CH_3\\-SiO-\\|\\H\end{array}\right]_2$ | $\left[\begin{array}{c}CH_3\\-SiO-\\|\\(CH_2)_5CH_3\end{array}\right]_2 \left[\begin{array}{c}CH_3\\-SiO-\\|\\ON(CH_2CH_3)_2\end{array}\right]_2$ | 1.4367 |

| Aminoxy-silicon material | Theory | | | | Found | | | |
|---|---|---|---|---|---|---|---|---|
| | C | H | N | Si | C | H | N | Si |
| (a) $C_{22}H_{55}O_7N_3Si_4$ | 45.09 | 9.39 | 6.23 | 19.17 | 45.23 | 9.20 | 6.23 | 21.93 |
| (b) $C_{20}H_{52}O_8N_4Si_4$ | 40.78 | 8.90 | 9.51 | 19.08 | 40.58 | 9.09 | 9.79 | 19.28 |
| (c) $C_{21}H_{53}O_7N_3Si_4$ | 44.13 | 9.28 | 7.36 | 19.61 | 43.84 | 9.37 | 7.19 | 19.94 |
| (d) $C_{20}H_{44}O_{12}N_4Si_4$ | 37.24 | 6.88 | 8.69 | 17.42 | 35.80 | 7.13 | 9.25 | 14.44 |
| (e) $C_{22}H_{54}O_6N_2Si_4$ | 47.60 | 9.81 | 5.04 | 20.24 | 46.86 | 10.16 | 5.29 | 20.70 |
| (f) $C_{24}H_{58}O_6N_2Si_4$ | 49.43 | 10.03 | 4.81 | 19.27 | 49.28 | 9.93 | 4.73 | 19.50 |

EXAMPLE 8

As shown in Example 1, 3,5-dihydro-1,1,1,3,5,7,7,7-octamethyltetrasiloxane was reacted with N,N-diethylhydroxylamine. There was obtained an isomeric mixture of 3,5-di(N,N-diethylaminoxy) - 1,1,1,3,5,7,7,7 - octamethyl tetrasiloxane in quantative yields. Analysis of the product showed; $n_D^{25}$ 1.4160. Elemental analysis $C_{16}H_{44}O_5N_2Si_4$; Theory (in percent): C, 42.06, H, 9.71, N, 6.13, Si, 24.59. Found (in percent): C, 42.48, H, 9.86, N, 5.89, Si, 25.30.

EXAMPLE 9

Following the procedure of Example 1, 1,3-dihydro-1,1,3,3-tetramethyldisiloxane and N,N-diethylhydroxylamine were reacted. There was obtained a quantative yield of 1,3-di(N,N-diethylaminoxy) - 1,1,3,3 - tetramethyldisiloxane having a boiling point of 88° C. to 90° C. at /2.5 mm.; $n_D^{25}$ 1.4220. Elemental analysis $C_{12}H_{32}N_2O_3Si_2$.

hydroxylamine were reacted at a temperature of about 70° C. After the evolution of hydrogen had ceased, the mixture was heated to strip off unreacted diethylhydroxylamine and the product was examined by infrared. Its infrared spectrum showed the presence of phenyl as well as silicon-oxygen-nitrogen linkages and the complete absence of silicon hydride linkage. Based on method of preparation and infrared spectrum, the product was:

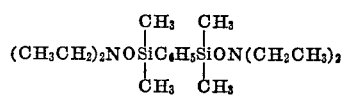

EXAMPLE 11

A mixture of 196 parts of tetraethoxysilane and 89 parts of N,N-diethylhydroxamine were mixed at 25° C. and then heated to reflux. Ethanol was continuously removed overhead until the reaction was complete. The product was isolated by fractional distillation at reduced pressure. There was obtained a product having a boiling point of 47° C. at 1 mm. Based on the method of preparation and the infrared spectrum of the product it was

While the foregoing has been limited to only a few of the very many examples within the scope of the present invention, it should be understood that the silicon hydrides and hydroxyl amines shown by Equation 2 can provide for a much broader class of aminoxyorganosilicon materials as shown by Formulae 3, 4, 7 and 8 and units of Formulae 5 and 6. In addition, the above examples show only a few of the very many variables which can be employed in the practice of the method of the present invention.

What I claim as new and desire to secure by Letters Patent of the United States is:

1. Aminoxyorganosilanes having the formula, $$(R')_b(A)_c Si[OY]_{4-(b+c)}$$

where Y is a monovalent amine radical selected from the class consisting of $-N(R)_2$ and a heterocyclic amine, R is a monovalent hydrocarbon radical, R' is a member selected from the class consisting of R radicals and halogenated R radicals, A is a member selected from the class consisting of hydrogen, alkoxy, and $R''_3SiO_{0.5}$, R'' is a member selected from the class consisting of R' radicals, and cyanolakyl radicals, b is a whole number equal to 0 to 2, inclusive, c is an integer equal to 1 to 3, inclusive, and the sum of b and c is equal to 1 to 3 inclusive.

2. Aminoxyorganosiloxanes having the formula,

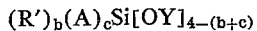

where Y is a monovalent amine radical selected from the class consisting of $-N(R)_2$ and a heterocyclic amine, R is a monovalent hydrocarbon radical, R' is selected from the class consisting of R radicals, and halogenated R radicals, and R'' is a member selected from the class consisting of R' radicals and cyanoalkyl radicals, d is a whole number equal to 0 to 3, inclusive, and e is an integer equal to 1 to 18, inclusive.

3. Aminoxyorganocyclopolysiloxanes composed of from 3 to 8 chemically combined siloxy units of which there is at least one aminoxyorganosiloxy unit of the formula,

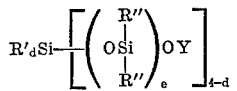

chemically combined with up to seven diorganosiloxy units of the formula, $$(R'')_2SiO$$

where Y is a monovalent amine radical selected from the class consisting of $-N(R)_2$ and a heterocyclic amine, R is a monovalent hydrocarbon radical, R' is a member selected from the class consisting of R radicals and halogenated R radicals, and R'' is a member selected from the class consisting of R' radicals and cyanolakyl radicals.

4. Aminoxyorganopolysiloxanes composed of at least one unit of the formula,

chemically combined with up to 18 diorganosiloxy units of the formula, $$(R'')_2SiO$$

and chain-stopped with $(R'')_3SiO_{0.5}$ units, where Y is a monovalent amine radical selected from the class consisting of $-N(R)_2$ and a heterocyclic amine, R is a monovalent hydrocarbon radical, R' is a member selected from the class consisting of R radicals and halogenated R radicals, and R'' is a member selected from the class consisting of R' radicals and cyanoalkyl radicals.

5. Aminoxyorganosilicon materials having the formula,

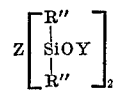

where Y is a monovalent amine radical selected from the class consisting of $-N(R)_2$ and a heterocyclic amine, R is a monovalent hydrocarbon radical, and Z is a member selected from the class consisting of oxygen, R''' and

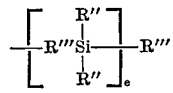

where R'' is a member selected from the class consisting of monovalent hydrocarbon radicals, halogenated monovalent hydrocarbon radicals and cyanoalkyl radicals, R''' is a divalent hydrocarbon radical, and e is an integer equal to 1 to 18, inclusive.

6.

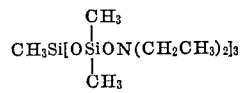

7.

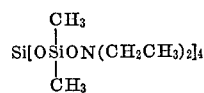

8. $(C_6H_5)_2Si[ON(C_2H_5)_2]_2$
9. $Si[ON(CH_2CH_3)_2]_4$
10. $C_5H_{11}SiH[ON(CH_2CH_3)_2]_2$
11.

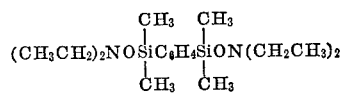

12. A method which comprises (1) reacting at a temperature in the range between 0° C. and 200° C., (A) a hydroxyl amine having the formula, YOH and (B) a silicon hydride having the formula, $HSi\equiv$, and (2) recovering from (1) a silicon material having at least one $-OY$ radical attached to silicon through a silicon-oxygen-linkage, where Y is a monovalent amine radical selected from the class consisting of $-N(R)_2$ and a heterocyclic amine, R is a monovalent hydrocarbon radical, and the valences of the silicon atom of said silicon hydride of (B) other than those satisfied by hydrogen are satisfied by members selected from the class consisting of oxygen, R', A, and Z, and mixtures thereof where A is a member selected from the class consisting of hydrogen, alkoxy and $R''_3SiO_{0.5}$, R' is a member selected from the class consisting of R radicals and halogenated R radicals, R'' member selected from the class consisting of R' radicals and cyanoalkyl radicals, and Z is a member selected from the class consisting of oxygen, R''' and

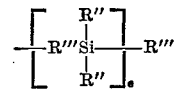

where R''' is a divalent hydrocarbon radical, and e is an integer equal to 1 to 18, inclusive.

13. A method for making an aminoxyorganosilane which comprises effecting reaction between an alkoxy silane and a hydroxylamine and continuously removing alcohol from the resulting mixture.

(References on following page)

References Cited

UNITED STATES PATENTS

| | | | |
|---|---|---|---|
| 3,099,672 | 7/1963 | Cooper, et al. | 260—448.2 |
| 3,318,898 | 5/1967 | Boissieras et al. | 260—293 XR |
| 2,955,127 | 10/1960 | Pike | 260—448.2 |
| 3,162,663 | 12/1964 | Beck | 260—448.2 |
| 3,296,199 | 1/1967 | Murphy | 260—46.5 XR |

TOBIAS E. LEVOW, *Primary Examiner.*

U.S. Cl. X.R.

260—448.8, 46.5, 239, 247, 293, 326.8; 117—123